US010468861B2

United States Patent
Lee et al.

(10) Patent No.: US 10,468,861 B2
(45) Date of Patent: Nov. 5, 2019

(54) DISTRIBUTION PANEL

(71) Applicant: LSIS CO., LTD., Anyang-si, Gyeonggi-do (KR)

(72) Inventors: Seog Won Lee, Anyang-si (KR); Ji Hoon Ma, Anyang-si (KR); Jong Doo Kim, Anyang-si (KR); Seung Hwan Mun, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/224,222

(22) Filed: Dec. 18, 2018

(65) Prior Publication Data

US 2019/0260186 A1    Aug. 22, 2019

(51) Int. Cl.
| | |
|---|---|
| *H02B 1/38* | (2006.01) |
| *H02B 1/30* | (2006.01) |
| *H02B 13/025* | (2006.01) |
| *H01H 9/34* | (2006.01) |
| *H05K 5/02* | (2006.01) |
| *H01H 9/36* | (2006.01) |
| *H02B 13/065* | (2006.01) |

(52) U.S. Cl.
CPC ............... *H02B 1/38* (2013.01); *H01H 9/342* (2013.01); *H01H 9/362* (2013.01); *H02B 1/306* (2013.01); *H02B 13/025* (2013.01); *H02B 13/065* (2013.01); *H01H 2009/343* (2013.01); *H05K 5/0213* (2013.01)

(58) Field of Classification Search
CPC .............................. H05K 5/0213; H01H 9/30

USPC ................................................. 361/600–678
See application file for complete search history.

(56) References Cited

U.S. PATENT DOCUMENTS

| | | | | |
|---|---|---|---|---|
| 5,710,402 A | * | 1/1998 | Karnbach | .............. H02B 1/565 218/157 |
| 6,129,237 A | | 10/2000 | Miyahara | |
| | | | (Continued) | |

FOREIGN PATENT DOCUMENTS

| | | |
|---|---|---|
| CN | 102227054 A | 10/2011 |
| JP | H10322811 A | 12/1998 |
| | (Continued) | |

OTHER PUBLICATIONS

Korean Office Action for related Korean Application No. 10-2018-0020002; action dated Apr. 12, 2019; (32 pages).

(Continued)

*Primary Examiner* — Zachary Pape
(74) *Attorney, Agent, or Firm* — K&L Gates LLP

(57) ABSTRACT

Provided is a distribution panel. The distribution panel includes a main busbar compartment in which a main busbar is provided and which is provided as an independent space and an arc duct provided at a rear side of the main busbar compartment to discharge an arc generated in the main busbar compartment. The main busbar compartment includes a communication hole defied in one surface of the main busbar to allow the main busbar compartment to communicate with the arc duct and a relief device rotatably provided on one side of the communication hole to open or close the communication hole. The relief device is bendable in multi stages. Thus, the arc may be effectively discharged while reducing a size of the distribution panel.

9 Claims, 7 Drawing Sheets

(56) References Cited

U.S. PATENT DOCUMENTS

| | | | | |
|---|---|---|---|---|
| 6,407,331 B1* | 6/2002 | Smith | ................... | H02B 13/025 |
| | | | | 174/17 VA |
| 7,974,078 B2* | 7/2011 | Coomer | ............... | H02B 13/025 |
| | | | | 312/236 |
| 10,305,262 B2* | 5/2019 | Johnson | ................. | H01H 33/66 |

FOREIGN PATENT DOCUMENTS

| | | |
|---|---|---|
| JP | 3293063 B2 | 6/2002 |
| KR | 200277899 Y1 | 5/2002 |
| KR | 200397327 Y1 | 9/2005 |
| KR | 100720293 B1 | 5/2007 |
| KR | 101329734 B1 | 11/2013 |
| KR | 101467528 B1 | 12/2014 |
| WO | 2017094449 A1 | 6/2017 |

OTHER PUBLICATIONS

Korean Notice of Allowance for related Korean Application No. 10-2018-0020002; action dated Sep. 10, 2019; (6 pages).

\* cited by examiner

PRIOR ART

PRIOR ART

DISTRIBUTION PANEL

CROSS-REFERENCE TO RELATED APPLICATIONS

The present application claims priority under 35 U.S.C. 119 and 35 U.S.C. 365 to Korean Patent Application No. 10-2018-0020002, filed on Feb. 20, 2018, which is hereby incorporated by reference in its entirety.

BACKGROUND

The present disclosure relates to a distribution panel. Particularly, the present disclosure relates to a structure in which an arc is easily discharged even in a narrow space when the arc is generated in a main busbar compartment.

Distribution panels are equipment that receives power to supply the power to load equipment installed in each power receiver.

Such a distribution panel may monitor, control, and protect a power system, and electronic equipment such as a circuit breaker, a current transformer, a power transformer, and the like may be accommodated in the distribution panel so as to be used.

In the distribution panel, the circuit breaker (CB), the current transformer (CT), the power transformer (PT), a main busbar, and the like may be accommodated in a cabinet. Also, a PT compartment, in which the PT is accommodated, a CB compartment, in which the CB is accommodated, a main busbar compartment, in which the main busbar is accommodated, and a cable compartment, in which a cable is accommodated, may be provided in independent spaces of the distribution panel.

An arc may be generated in three-phase short circuit in the distribution panel. Since the distribution panel has a sealed inner structure, in the case in which the arc is not properly discharged when the arc is generated, for example, a member of a door of the distribution panel may be separated due to the high pressure of the arc to make loss of lives.

Thus, generally, the distribution panel is provided with a relief device and an arc duct, which easily discharge the arc when the arc is generated.

FIGS. 1 and 2 illustrate a distribution panel according to the related art. In a distribution panel 1a according to the related art, when an arc is generated in a main busbar compartment 50a, a passage communicating with the arc duct 70a may be opened due to rotation of the relief device 80a to discharge the arc to the arc duct 70a.

However, in the case of the relief device provided in the main busbar compartment 50a according to the related art, it is necessary to secure a front and rear width of the arc duct 70a at a predetermined distance so that the relief device 80a is sufficiently opened while being opened toward the arc duct 70a.

Thus, the overall size of the distribution panel 1a may increase for the front and rear width of the arc duct 70a that is necessary for the operation of the relief device 80a. Therefore, it is difficult to miniaturize the product.

SUMMARY

Embodiments provide a distribution panel, which facilitates discharge of an arc while reducing a front and rear width of an arc duct to realize miniaturization because a relief device is rotatably provided in multi stages.

In one embodiment, a distribution panel includes: a main busbar compartment in which a main busbar is provided and which is provided as an independent space; and an arc duct provided at a rear side of the main busbar compartment to discharge an arc generated in the main busbar compartment, wherein the main busbar compartment includes: a communication hole defied in one surface of the main busbar to allow the main busbar compartment to communicate with the arc duct; and a relief device rotatably provided on one side of the communication hole to open or close the communication hole, wherein the relief device is bendable in multi stages.

The relief device may include: an upper cover covering an upper portion of the communication hole; a lower cover provided on a lower end of the upper cover to cover a lower portion of the communication hole; a cover connection part rotatably connecting the upper cover to the lower cover; and a main hinge rotatably connecting the lower cover to the main busbar compartment.

The cover connection part may include a hinge.

The relief device may further include a fixing member provided on an upper edge of the upper cover to connect the upper cover to the main busbar compartment.

Each of the upper cover and the lower cover may have a vertical length less than a forward and backward length of the arc duct.

Each of the cover connection part and the main hinge may be provided in a pair, which are spaced apart from each other in a left and right direction, and the fixing member may be disposed at a position corresponding to a space between the pair of cover connection parts or the pair of main hinges.

The sum of the vertical length of the upper cover and the vertical length of the lower cover may be greater than the forward and backward length of the arc duct.

The upper cover may have a rounded upper end.

A roller may be provided on an upper end of the upper cover.

The cover connection part may be rotatable at an angle of about 360 degrees.

The details of one or more embodiments are set forth in the accompanying drawings and the description below. Other features will be apparent from the description and drawings, and from the claims.

DETAILED DESCRIPTION OF THE EMBODIMENTS

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
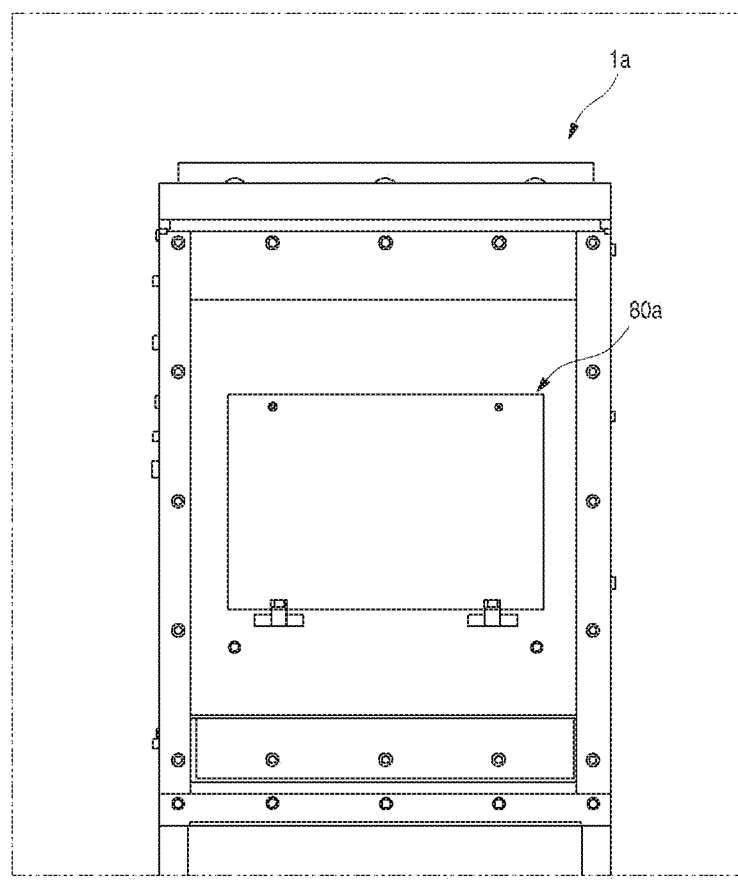
FIG. 1 is a front view illustrating a relief device of a distribution panel according to a related art.
Figure 2:
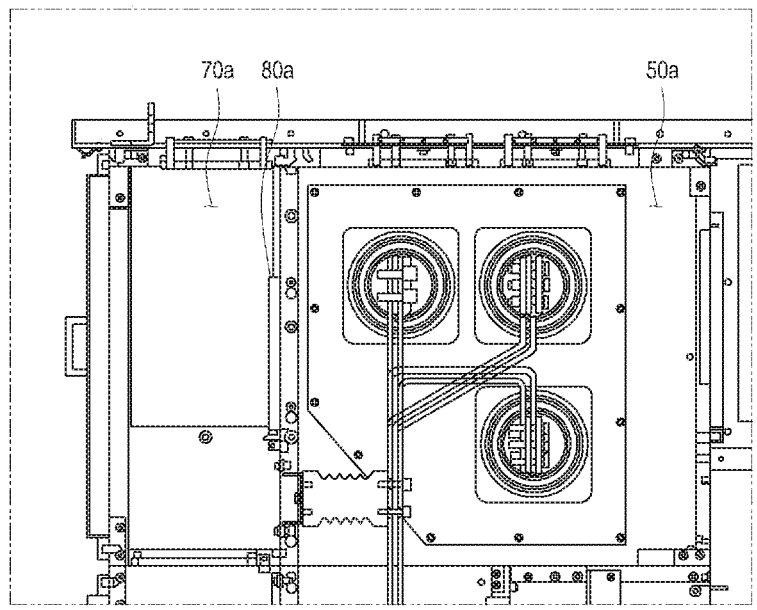
FIG. 2 is a side view illustrating the relief device of the distribution panel according to the related art.
Figure 3:
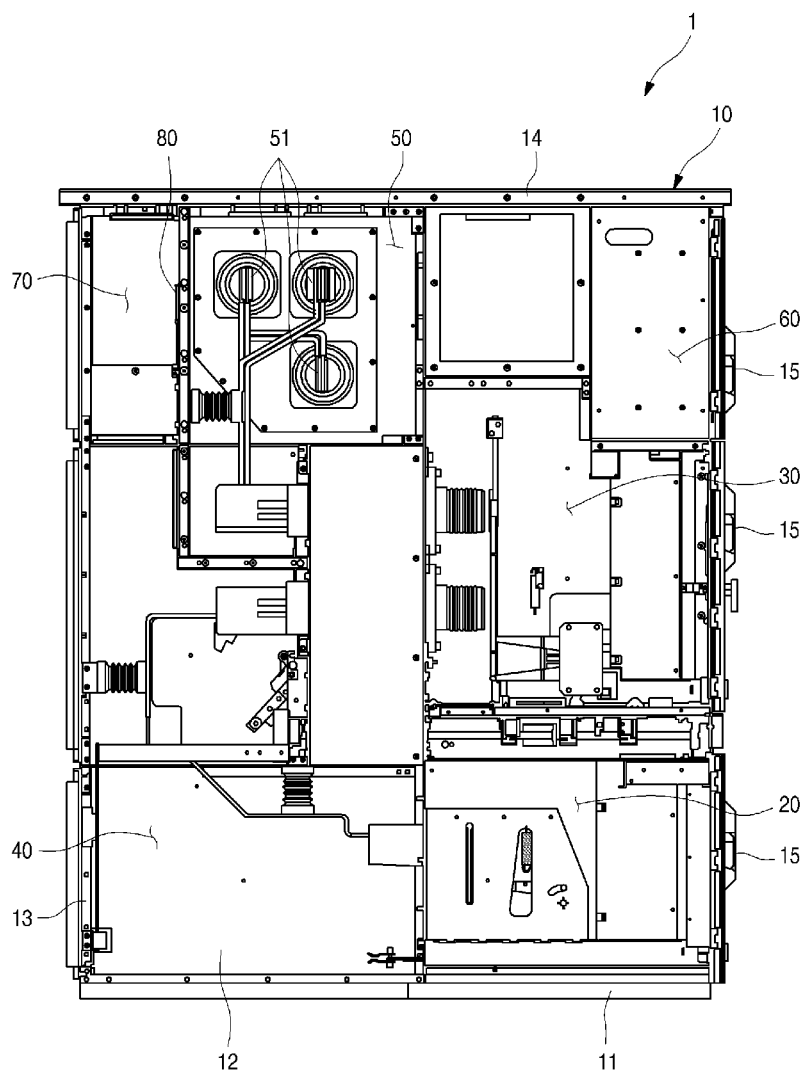
FIG. 3 is a side view of a distribution panel according to an embodiment.

FIG. 3 is a side view of a distribution panel according to an embodiment.

Referring to FIG. 3, a distribution panel 1 according to an embodiment may include a cabinet 10 having an inner space and defining an outer appearance of the distribution panel 1.

The cabinet 10 may include a base 11, a side body 12 disposed above the base 11 to define a side surface of the cabinet 10, a rear body 13 disposed above the base 11 to define a rear surface of the cabinet 10, and a top body disposed above the side body 12 and the rear body 13.

The side body 12 may be provided in a pair, and the pair of side bodies 12 may be respectively disposed on both left and right sides of the base 11.

Also, each of the base 11, the side body 12, the rear body 13, and the top body 14 may be constituted by an assembly of a plurality of members.

The distribution panel 1 may include a power transformer, a circuit breaker, a cable, a main busbar 51 in an inner space of the cabinet 10.

The inside of the cabinet 10 may be divided into a plurality of compartments. Also, the power transformer, the circuit breaker, the cable, and the main busbar 51 may be accommodated in the compartments, respectively. The compartment in which the power transformer is accommodated may be called a power transformer compartment 20, the compartment in which the circuit breaker is accommodated may be called a circuit breaker compartment 30, the compartment in which the cable is accommodated may be called a cable compartment 40, and the compartment in which the main busbar is accommodated may be called a main busbar compartment 50.

The power transformer compartment 20 may be defined in a portion of a front side of the base 11. Also, the circuit breaker compartment 30 may be provided above the power transformer compartment 20. Also, the cable compartment 40 may be defined in a portion of a rear side of the base 11. Also, the main busbar compartment 50 may be provided above the cable compartment 40.

Also, a relay compartment 60 in which a relay for controlling the distribution panel 1 is provided may be provided above the circuit breaker compartment 30.

Thus, the power transformer compartment 20, the circuit breaker compartment 30, the relay compartment 60 may be provided in a relatively front side within the cabinet 10, and the main busbar compartment 50 and the cable compartment 40 may be provided in a relatively rear side within the cabinet 10.

A front surface of the cabinet 10 may be openable. The opened front surface of the cabinet 10 may be opened and closed by at least one front door 15.

For example, each of front surfaces of the power transformer compartment 20, the circuit breaker compartment 30, and the relay compartment 60, which are provided at the front of the cabinet 10, may be opened, and the front door 15 may be disposed on each of the opened front surfaces.

The front door 15 opening and closing the circuit breaker compartment 30 may rotate with respect to one side of left and right sides of the cabinet 10 to open and close the circuit breaker compartment 30.

The distribution panel 1 may include an arc duct 70 provided at a rear side of the main busbar compartment 50 to discharge the arc that may be generated in the main busbar compartment 50.

A communication hole 52 (see FIG. 4) communicating with the arc duct 70 may be defined in one side of the main busbar compartment 50. Also, a relief device 80 may be rotatably fixed to the communication hole 52 to open and close the communication hole 52.

The relief device 80 will be described in detail with reference to FIGS. 4 to 7.

Figure 4:
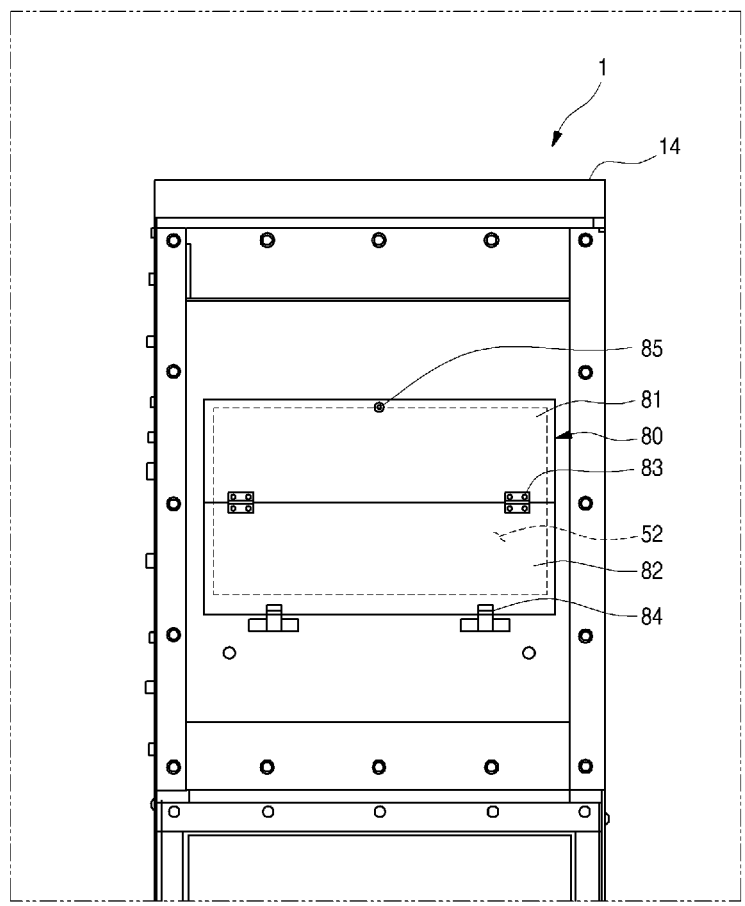
FIG. 4 is a front view illustrating a relief device of the distribution panel according to an embodiment.

FIG. 4 is a front view illustrating the relief device of the distribution panel according to an embodiment.

Referring to FIG. 4, the relief device 80 according to an embodiment may include an upper cover 81 covering a portion of an upper side of the communication hole 52, a lower cover 82 covering a portion a lower side of the communication hole 52, a cover connection part 83 rotatably connecting the upper cover 81 to the lower cover 82, a main hinge 84 rotatably connecting the lower cover 82 to the main busbar compartment 50, and a fixing member 85 fixing the upper cover to the main busbar compartment 50.

The upper cover 81 may have a size slightly greater than a half of the upper side of the communication hole 52 and have a rectangular shape. Also, the lower cover 82 may have a size slightly greater than the rest half of the communication hole, which is not covered by the lower cover 82, and have a rectangular shape. Thus, the communication hole 52 may be covered by the upper cover 81 and the lower cover 82.

However, the size and shape of each of the upper cover 81 and the lower cover 82 may be variously modified within a range in which the communication hole 52 is capable of being covered. For example, the upper cover 81 may have a size greater than that of the lower cover 82, or each of an upper end of the upper cover 81 and a lower end of the lower cover 82 may have a rounded shape. Thus, when the upper cover 81 and the lower cover 82 are connected to each other, an outer appearance may be provided in a circle shape.

The cover connection part 83 may rotatably connect a lower end of the upper cover 81 to an upper end of the lower cover 82. Particularly, the cover connection part 83 may be provided to be rotatable at an angle of about 180 degrees in a clockwise direction or a counterclockwise direction when the upper cover 81 and the lower cover 82 are connected in parallel to each other. Thus, the cover connection part 83 may rotate at an angle of about 360 degrees.

As illustrated in FIG. 4, the cover connection part 83 may include a hinge. In this case, the cover connection part 83 may be called a sub hinge.

However, this embodiment is not limited thereto. For example, the cover connection part 83 may include a wire having a thickness less than that of each of the upper cover 81 and the lower cover 82. Also, for another example, the cover connection part 83 may be made of a flexible material having a thickness less than that of each of the upper cover 81 and the lower cover 82.

The main hinge 84 may connect the lower cover 82 to the main busbar compartment 50. In more detail, the communication hole 52, which is opened forward and backward, may be defined in a rear plate of the main busbar compartment 50, and the main hinge 84 may rotatably connect the lower cover 82 to the main busbar compartment 50. In more detail, the main hinge 84 may rotatably connect a lower edge of the lower cover 82 to a lower edge of the communication hole 52. The lower cover 82 may rotate to only a rear side of the rear plate of the main busbar compartment 50 but may not rotate to a front side of the rear plate.

In summary, the main hinge 84 may be disposed outside the main busbar compartment 50, i.e., the lower end of the communication hole 52 communicating with the arc duct 70 so that the lower cover 82 rotates to the outside of the main busbar compartment 50.

The fixing member 85 may be disposed on an upper edge of the upper cover 81 to fix the upper cover 81 to the main busbar compartment 50, more particularly, the rear plate of the main busbar compartment 50. For example, the fixing member 85 may have a wedge shape. Also, in a state in which the communication hole 52 is closed by the relief device 80, a fixing hole may be defined in one side of the main busbar compartment 50 corresponding to the position of the fixing member 85. In more detail, the fixing hole may be defined in the rear plate of the main busbar compartment 50 so that the fixing member 85 is restricted to be hooked with the fixing hole.

Thus, the upper cover 81 may be fixed when the fixing member 85 partially passes through the fixing hole so as to be hooked. However, the fixing member 85 and the fixing hole may be provided at positions opposite to each other. That is, the fixing member 85 may be disposed at one side of the main busbar compartment 50, and the fixing hole may be defined in the upper side of the upper cover 81.

Each of the cover connection part 83 and the main hinge 84 may be provided in plurality. For example, each of the cover connection part 83 and the main hinge 84 may be provided in a pair, which are horizontally spaced apart from each other. Also, the fixing member 85 may be disposed at a position corresponding to a space between the pair of cover connection parts 83 and between the pair of main hinges 84.

Next, a process in which the relief device 80 is opened when the arc is generated in the main busbar compartment 50 will be described with reference to FIGS. 5 to 7.

Actually, when the fixing of the fixing member 85 is released by the arc in the main busbar compartment 50, the rotation of the upper cover 81 and the lower cover 82 may be simultaneously performed by the cover connection part 83 and the main hinge 84. However, for convenience of the description, an example, in which the upper cover 81 rotates, and the lower cover 82 rotates after the fixing of the fixing member 85 is released, will be described.

Figure 5:
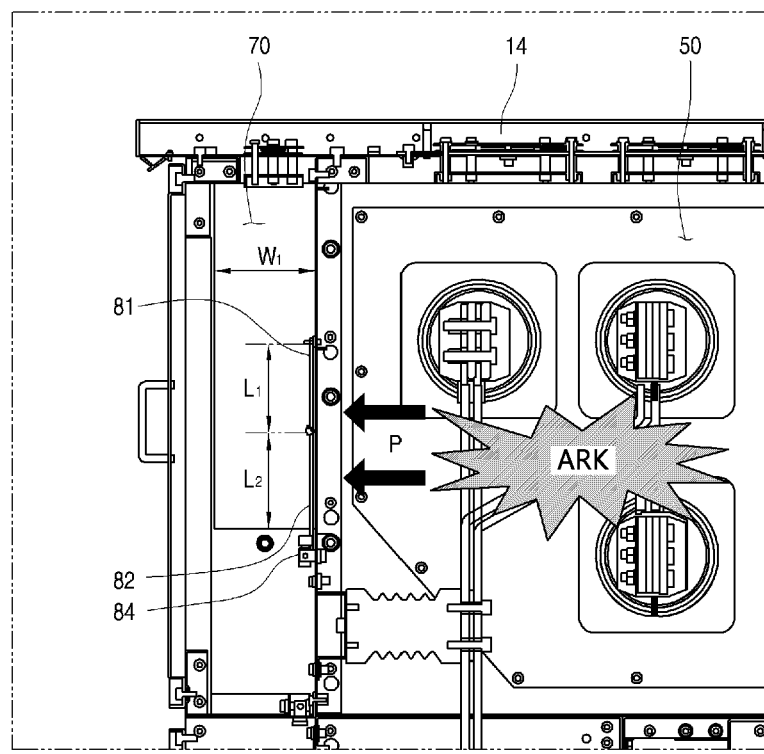
FIG. 5 is a view illustrating a state in which an arc is generated in a main busbar compartment according to an embodiment.

FIG. 5 is a view illustrating a state in which the arc is generated in the main busbar compartment according to an embodiment. FIG. 6 is a view illustrating a state in which the upper cover is opened according to an embodiment. FIG. 7 is a view illustrating a state in which the upper cover and the lower cover are opened according to an embodiment.

Referring to FIG. 5, for example, when three-phase short circuit occurs in the main busbar compartment 50, the arc may be generated. Also, a high pressure may be generated in the main busbar compartment 50 by the arc. The high pressure may apply force to the fixing member 85, which is relatively weakly coupled, to release the fixing of the fixing member 85.

Figure 6:
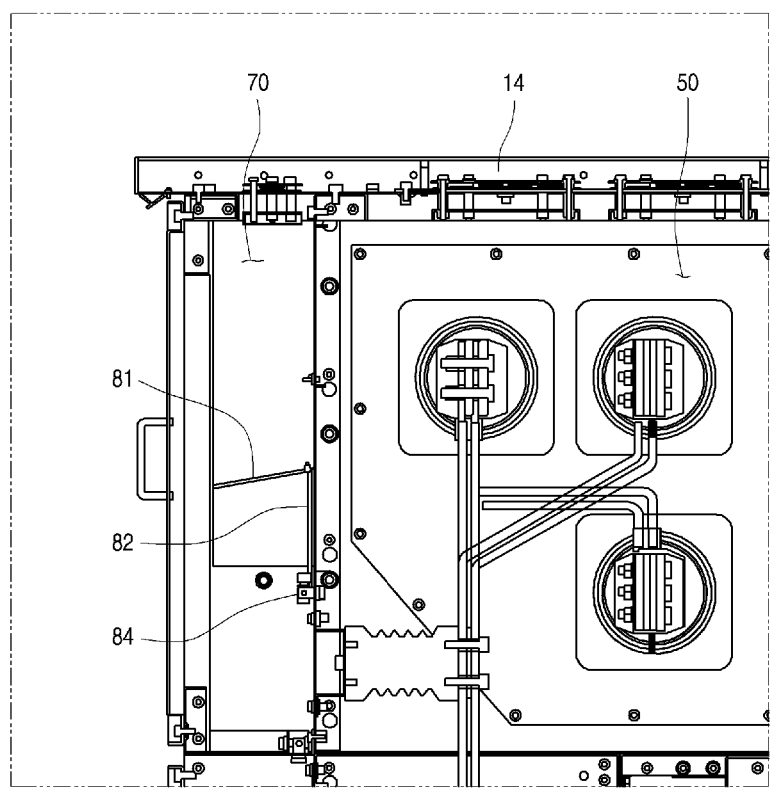
FIG. 6 is a view illustrating a state in which an upper cover is opened according to an embodiment.
Figure 7:
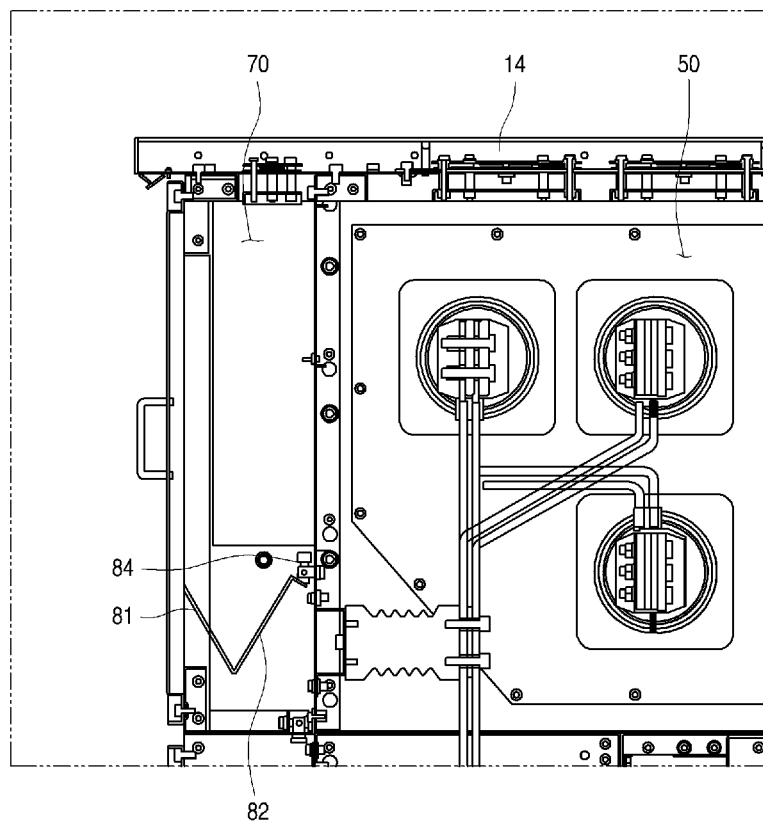
FIG. 7 is a view illustrating a state in which the upper cover and a lower cover are opened according to an embodiment.

Thus, as illustrated in FIG. 6, the fixing of the fixing member 85 may be released, and the upper cover 81 may rotate by using the cover connection part 83 as an axis. Here, the upper cover 81 may rotate in a counterclockwise direction toward the arc duct 70 to open a portion of the upper portion of the communication hole 52.

Also, when the portion of the upper cover 81 is opened, the discharge of the pressure (the arc) within the main busbar compartment 50 may start. Thus, the lower cover 82 may also rotate in the counterclockwise direction by the pressure as illustrated in FIG. 7. Also, the upper end of the upper cover 81 may contact the rear end of the arc duct 70 or the rear body 13 (see FIG. 3) due to the rotation of the lower cover 82. Hereinafter, a case in which the upper end of the upper cover 81 contacts the rear end of the arc duct 70 will be described as an example.

Here, the sum (L1+L2) of vertical lengths of the upper cover 81 and the lower cover 82 may be greater than a forward and backward length W1 of the arc duct 70. In this case, each of the upper cover 81 and the lower cover 82 may be bent by the cover connection part 83. Here, the relief device 80 may be bent upward as illustrated in FIG. 7.

Each of the vertical length L1 of the upper cover 81 and the vertical length L2 of the lower cover 82 may be less than the forward and backward length W1 of the arc duct 70.

Next, the lower cover 82 may further rotate by the pressure due to the gravity and the arc in the counterclockwise direction by using the main hinge 84 as the axis. Thus, the relief device 80 may be bent downward as illustrated in FIG. 7. Here, the upper cover 81 may vertically move along a rear surface of the arc duct 70.

The upper end of the upper cover 81 may be rounded in a curved shape. Thus, when the upper end of the upper cover 81 contacts the rear side of the arc duct 70, a contact area may be reduced to reduce friction. Thus, in the arc duct 70, when the upper cover 81 contacts the rear side of the arc duct 70, the upper cover 81 may easily move.

Also, a rotatable roller (not shown) may be provided on the upper end of the upper cover 81. The roller may rotate by contacting the roller when the upper end of the upper cover 81 contacts the rear side of the arc duct. The roller may also facilitate the movement of the upper cover 81.

Also, each of vertical heights L1 and L2 of the upper cover 81 and the lower cover 82 may be less than the forward and backward length W1 of the arc duct 70. Thus, the upper cover 81 and the lower cover 82 may rotate without being hooked with the arc duct 70.

When the arc is generated in the main busbar compartment 80 according to the above-described processes, the upper cover 81 and the lower cover 82 may rotate, and thus all the upper cover 81 and the lower cover 82 may move to a lower side of the arc duct 70. Thus, an area by which the communication hole 52 and the arc duct 70 are connected to each other, i.e., an area through which the arc is discharged may be sufficiently secured.

In addition, although the relief device 80 is constituted by the upper cover 81 and the lower cover 82 in this embodiment, the relief device 80 may be divided into three or more covers, i.e., upper, intermediate, and lower covers or more.

The relief device 80 may have a structure, which is provided with the upper cover and the lower cover and rotatable in multi stages, to reduce the forward and backward length of the arc duct, thereby effectively discharging the arc while reducing the size of the distribution panel.

In addition, each of the upper cover and the lower cover may have the vertical length less than the forward and backward length of the arc duct to easily open the relief device.

Also, the sum of the vertical lengths of the upper cover and the lower cover may be greater than the forward and the backward length of the arc duct by the structure of the cover connection part. Thus, the size of the communication hole covered by the upper cover and the lower cover may be sufficiently large. Therefore, the arc may be more smoothly discharged.

Also, the upper end of the upper cover may be rounded, or the roller may be provided on the upper end of the upper cover to more easily open the relief device.

In addition, the forward and backward length of the arc duct may be reduced to effectively discharge the arc while reduce the size of the distribution panel without changing designs of the power transformer compartment, the circuit breaker compartment, the relay compartment, the cable compartment, and the main busbar compartment.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

What is claimed is:

1. A distribution panel comprises:
    a main busbar compartment in which a main busbar is provided and which is provided as an independent space; and
    an arc duct provided at a rear side of the main busbar compartment to discharge an arc generated in the main busbar compartment,
    wherein the main busbar compartment comprises:
    a communication hole defined in one surface of the main busbar compartment to allow the main busbar compartment to communicate with the arc duct; and
    a relief device rotatably provided on one side of the communication hole to open or close the communication hole,
    wherein the relief device is bendable in multi stages and comprises an upper cover covering an upper portion of the communication hole; a lower cover provided on a lower end of the upper cover to cover a lower portion of the communication hole; a cover connection part rotatably connecting the upper cover to the lower cover; and a main hinge rotatably connecting the lower cover to the main busbar compartment.

2. The distribution panel according to claim 1, wherein the cover connection part comprises a hinge.

3. The distribution panel according to claim 1, wherein the relief device further comprises a fixing member provided on an upper edge of the upper cover to connect the upper cover to the main busbar compartment.

4. The distribution panel according to claim 3, wherein each of the cover connection part and the main hinge is provided in a pair, which are spaced apart from each other in a left and right direction, and
    the fixing member is disposed at a position corresponding to a space between the pair of cover connection parts or the pair of main hinges.

5. The distribution panel according to claim 1, wherein each of the upper cover and the lower cover has a vertical length less than a forward and backward length of the arc duct.

6. The distribution panel according to claim 5, wherein the sum of the vertical length of the upper cover and the vertical length of the lower cover is greater than the forward and backward length of the arc duct.

7. The distribution panel according to claim 1, wherein the upper cover has a rounded upper end.

8. The distribution panel according to claim 1, wherein a roller is provided on an upper end of the upper cover.

9. The distribution panel according to claim 1, wherein the cover connection part is rotatable at an angle of about 360 degrees.

* * * * *